United States Patent
Turner, Jr. et al.

(10) Patent No.: US 8,904,334 B2
(45) Date of Patent: Dec. 2, 2014

(54) FOOTPRINT-BASED OPTIMIZATION PERFORMED SIMULTANEOUSLY WITH OTHER STEPS

(75) Inventors: Barry David Turner, Jr., Leesport, PA (US); Cristian Eugen Golovanov, Allentown, PA (US); Henry Shiu-Wen Sheng, San Mateo, CA (US)

(73) Assignee: Synopsys, Inc., Mountain View, CA (US)

( * ) Notice: Subject to any disclaimer, the term of this patent is extended or adjusted under 35 U.S.C. 154(b) by 18 days.

(21) Appl. No.: 13/536,903

(22) Filed: Jun. 28, 2012

(65) Prior Publication Data
US 2014/0007035 A1    Jan. 2, 2014

(51) Int. Cl.
G06F 9/455 (2006.01)
G06F 17/50 (2006.01)

(52) U.S. Cl.
USPC ........... 716/134; 716/108; 716/111; 716/113; 716/126; 716/132

(58) Field of Classification Search
USPC .................. 716/108, 113, 114, 126–135
See application file for complete search history.

(56) References Cited

U.S. PATENT DOCUMENTS

| | | |
|---|---|---|
| 6,289,490 B1 | 9/2001 | Boyd et al. |
| 2006/0053395 A1* | 3/2006 | Lai et al. ................ 716/6 |
| 2007/0180415 A1* | 8/2007 | Pundoor ................ 716/6 |
| 2008/0168412 A1 | 7/2008 | Cheon et al. |
| 2008/0244476 A1 | 10/2008 | Fotakis et al. |
| 2010/0153897 A1* | 6/2010 | Zahn ................ 716/9 |
| 2010/0218157 A1 | 8/2010 | McMurchie et al. |
| 2012/0131531 A1 | 5/2012 | Tirumala |

FOREIGN PATENT DOCUMENTS

WO    WO2012/010934    *    1/2012

OTHER PUBLICATIONS

PCT/US2013/047999, International Search Report and Written Opinion, Date of Mailing Oct. 18, 2013, 14 pages.

* cited by examiner

*Primary Examiner* — Nha Nguyen
(74) *Attorney, Agent, or Firm* — HIPLegal LLP; Judith A. Szepesi (57) ABSTRACT

A method comprising placing elements in a layout, performing clock tree synthesis, and performing routing. The method further comprising, in parallel with one of the clock tree synthesis or the routing, performing a footprint based optimization, substituting a footprint equivalent element in a path based on a timing slack of the path.

18 Claims, 7 Drawing Sheets

FOOTPRINT-BASED OPTIMIZATION PERFORMED SIMULTANEOUSLY WITH OTHER STEPS

FIELD

The present invention relates to circuit design, and in particular to footprint based optimization in circuit design.

BACKGROUND

High performance integrated circuit designs generally require multiple optimization steps to push performance and minimize leakage power resulting in large runtime requirements. For example, leakage recovery can take 30% of the total circuit optimization runtime. The necessity for such optimization continues to increase, along with its computational cost, as circuit designs become bigger and more complex. Historically, turn-around-times for circuit optimization and layout tend to be between 1-3 days, so if leakage optimization consumes 30% of computation time, this can imply up to 24 hours of runtime for leakage optimization.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Circuit layout includes multiple optimization steps in general. These optimization steps, in one embodiment, can add significant amount of time and power overhead to the design. Modern chip designs are heavily trending towards higher complexity and larger size. Runtime continues to be a primary issue and bottleneck on design methodologies.

The present invention, in one embodiment, provides a method of simultaneously implementing footprint based optimization with other unrelated steps. In one embodiment, the footprint-based optimization may be leakage recovery and timing recovery. Leakage recovery provides a benefit by replacing faster but more power hungry (leaky) cells with slower but less power hungry cells on paths with positive timing slack. Timing recovery provides its benefit by replacing slow cells with faster cells on paths with negative slack. Because footprint equivalent cells are physically identical on the routing layers swapping causes no physical or parasitic/timing disturbance. This enables the footprint based optimization to take place in parallel with other steps. This reduces the cost of leakage recovery and timing recovery.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
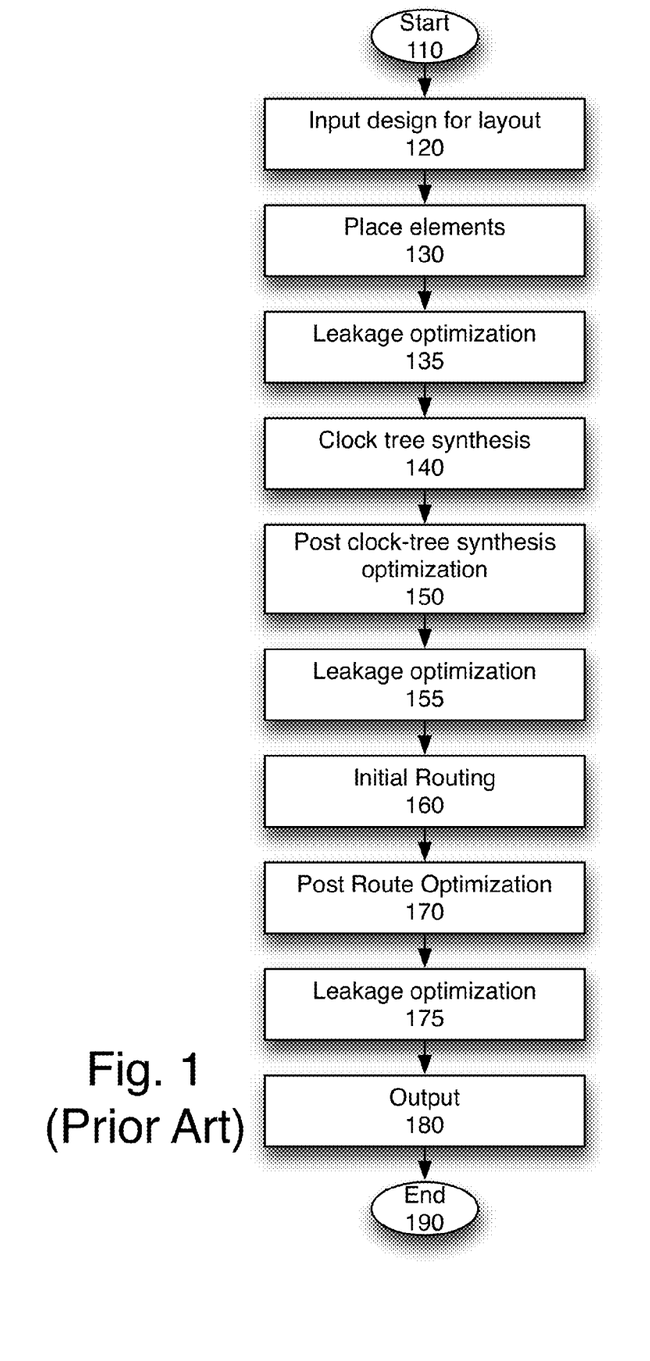
FIG. 1 is flowchart of a prior art integrated circuit design.

FIG. 1 is flowchart of a prior art integrated circuit design. The process starts at block 110. At block 120, the design for the layout is provided to the system. In one embodiment, the design for the layout is provided in a hardware description language (HDL) that allows definition of a hardware model at the gate level, the register transfer level (RTL), or the behavioral level using abstract data types. In another embodiment, the layout data may be provided in another format.

High Level Synthesis (HLS) is a process of converting the behavioral descriptions of HLD (High Level Description) to register transfer level (RTL) descriptions. HLS is typically done with a set of design goals and constraints. While there may be many different ways to implement the behavior of the HLD, HLS seeks to do so while minimizing particular defined costs. The defined costs are typically things such as cycle time, part count, silicon area, power, interconnections, pin count, etc. The constraints are typically driven by form factors, packaging constraints, interoperability, and similar concerns. HLS can be described as compiling a specification written in a high level language (HLL), allocating hardware resources to the operations in the specification, and then generating the RTL description.

To generate the RTL description, the HLS schedules the operations, allocates the operation to particular functional hardware units, allocates any variables to storage elements, and allocates any data transfers to communications buses that connect the functional units to storage registers and input/output interfaces.

At block 130, the elements are placed. The elements, in one embodiment, are the cells that provide the functionality defined by the RTL description. The cells are selected, in one embodiment, from one or more libraries of cells. Cell libraries define cells by size, and other characteristics, in one embodiment.

At block 135, the system performs leakage optimization. Leakage optimization attempts to reduce the power leakage (e.g. excess power consumption). Leakage optimization is done at each stage, in order to account for the power consumption changes, as the synthesis is performed.

At block 140, the process performs clock tree synthesis. The elements, placed at block 130, are be driven by associated clock signals. The clock tree synthesis generates the clock signals to drive the elements.

At block 150, the post-clock tree synthesis optimization is performed. The optimization may reroute some signals, based on the outcome of the clock tree synthesis, and optionally move elements placed previously, at block 130 above.

At block 155, leakage optimization is again performed.

At block 160, the initial routing is performed. The initial routing routes all necessary signals from and to the elements. These signals include input signals, output signals, and clock signals.

At block 170, the post-route optimization is performed. Post-route optimization may adjust the placement of elements, and clock tree, in light of the signal routing. The signal routing defines the location of the wiring in the circuit.

At block 175, another round of leakage optimization takes place.

At block 180, the output is generated. This output may be used to generate a circuit. As described, multiple rounds of leakage optimization take place, in one embodiment, after each design step. The flowchart shown is obviously simplified, not showing each of the steps for complete design. However, the repetition of the leakage optimization is the focus. One of skill in the art would know that there are additional steps in generating a final output.

Figure 2:
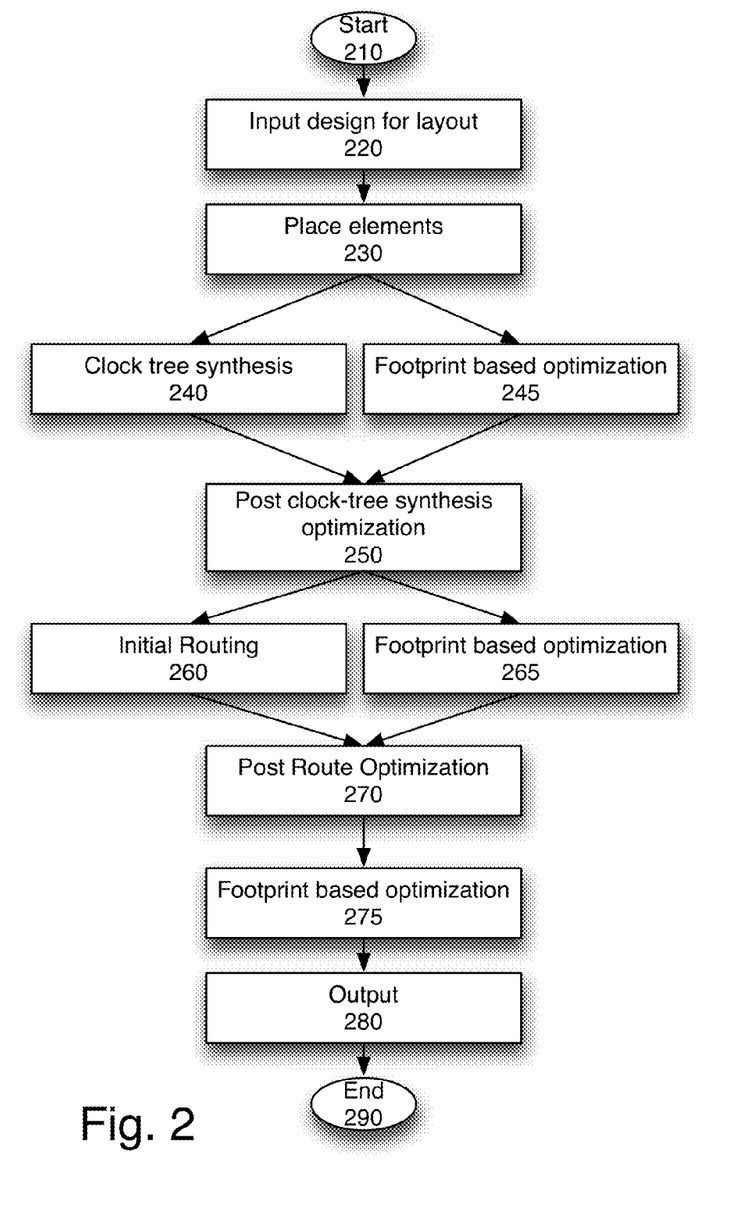
FIG. 2 is an overview flowchart of one embodiment of the integrated circuit design in accordance with the present invention.

FIG. 2 is an overview flowchart of one embodiment of the integrated circuit design in accordance with the present invention. The process starts at block 210. At block 220, the design for the layout is input. The design, in one embodiment, produces an RTL including a plurality of elements, and their relationships.

At block 230, the elements are placed.

At block 240, the clock tree synthesis is performed. In one embodiment, in parallel footprint based optimization is performed 245. Footprint based optimization takes as the input the element placement, and independent of the main flow provides a footprint-based optimization. In one embodiment, the parallel footprint based optimization may take place on the same processor, on the same computer system in a parallel processor, or on a separate computer system.

At block 250, the post clock-tree synthesis optimization is performed.

The initial routing, at block 260, is performed in parallel with a second footprint based optimization process, at block 265.

The post-route optimization at block 270 is followed by a last footprint based optimization at block 275. The process results in an output 280, which is available to be implemented. The process then ends at block 290.

Figure 3:
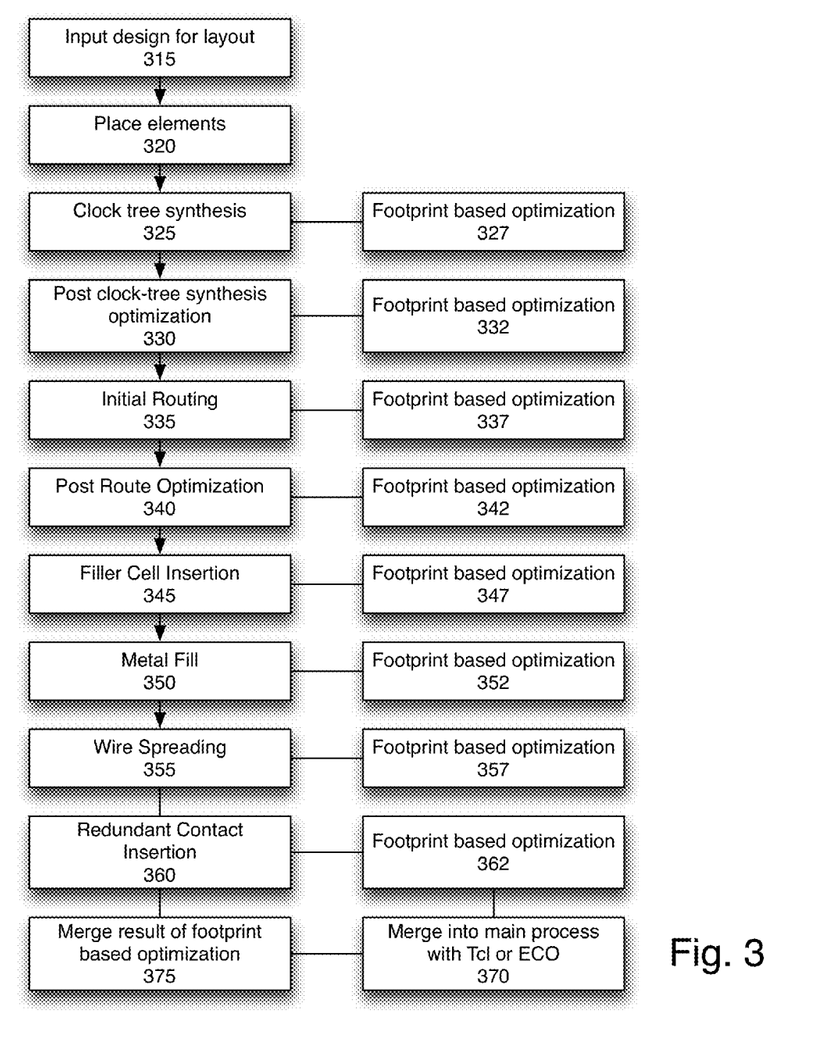
FIG. 3 is a flowchart of one embodiment of integrated circuit design including parallel footprint-based optimization.

FIG. 3 is a flowchart of one embodiment of circuit design including parallel execution of footprint-based optimization. In one embodiment, the parallel footprint based optimization is performed on a separate processor, in the same computer system or a different computer system. The integrated circuit design is processor intensive, thus it is beneficial to be able to move the footprint-based optimization to a separate processor.

The separate columns, illustrate the separate parallel processes that take place. The standard circuit design is on the left, and the parallel footprint-based optimization is on the right. After all of the circuit design steps are performed, blocks 315-360, and all of the footprint-based optimization steps are performed, block 327-362, the final results of the footprint based optimization are merged into the main process, at block 370. In one embodiment, the results of the footprint-based optimization are merged using Tool Command Language (Tcl) or Engineering Change Order (ECO), or a similar mechanism. The merged results, at block 375, form a final circuit layout, which can then be used.

Figure 4:
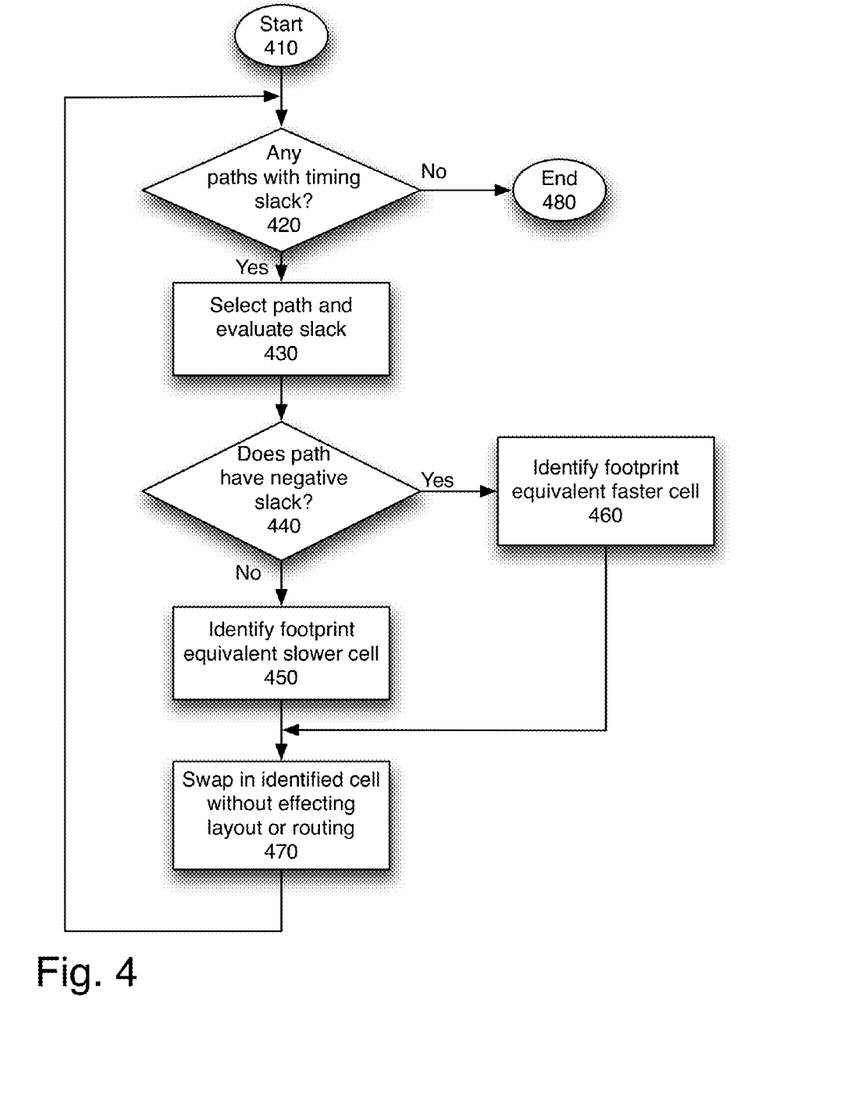
FIG. 4 is a flowchart of one embodiment of footprint-based optimization.

FIG. 4 is a flowchart of one embodiment of footprint-based optimization. In one embodiment, this flow corresponds to the "footprint-based optimization" steps described above. The process starts at block 410.

At block 420, the process determines whether there are any paths with timing slack. In this context, slack is the difference between the required time and the actual time that a path is completed. Positive slack means that the time to complete the path may be increased without affecting the overall delay of the circuit. Conversely, negative slack means that a path is slow, and the path should be sped up (or the other signals delayed) to ensure that the timing of the circuit works properly.

If there are no paths with timing slack, the process ends at block 480. If there are paths with timing slack, the process continues to block 430.

At block 430, the path is selected, and the slack is evaluated. At block 440, the process determines whether the path has negative slack. If so, it means that the path is slower than it should be. Therefore, at block 460. a footprint equivalent faster cell is selected. On the other hand, if the path has positive slack, at block 450 a footprint equivalent slower cell is identified.

Figure 5:
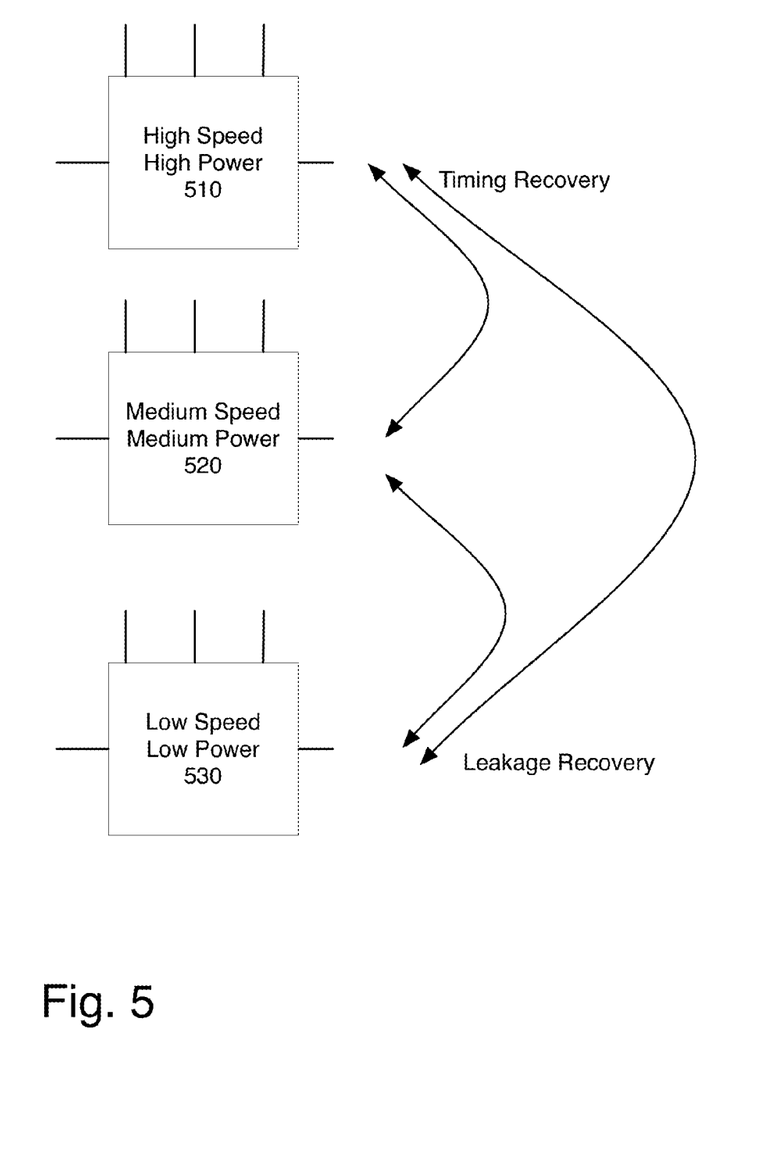
FIG. 5 is a diagram illustrating one embodiment of footprint-based optimization.

In general, multiple libraries at various speeds have footprint equivalent cells. FIG. 5 illustrates three exemplary libraries, the high-speed high power library 510, the medium speed medium power library 520, and the low speed and low power library 530. In general, higher speed cells generally consumer more power, while lower speed cells consume less power. Therefore, by performing footprint-based optimization, leakage recovery and timing recovery can be performed by doing footprint-based optimization. Note that while only 3 levels are shown in FIG. 5, the footprint equivalent cells may range from two (slower and faster) to five or even more. In one embodiment, the automatic replacement increments and decrements the speed one step at a time. However, over time, since paths are reevaluated, the optimal level for each cell is reached.

At block 470, the identified cell is swapped into the circuit. Because the cell is footprint equivalent, no layout or routing is impacted by the swap. In this way, the footprint based optimization minimizes power consumption and ensures that the timing is optimal.

Figure 6:
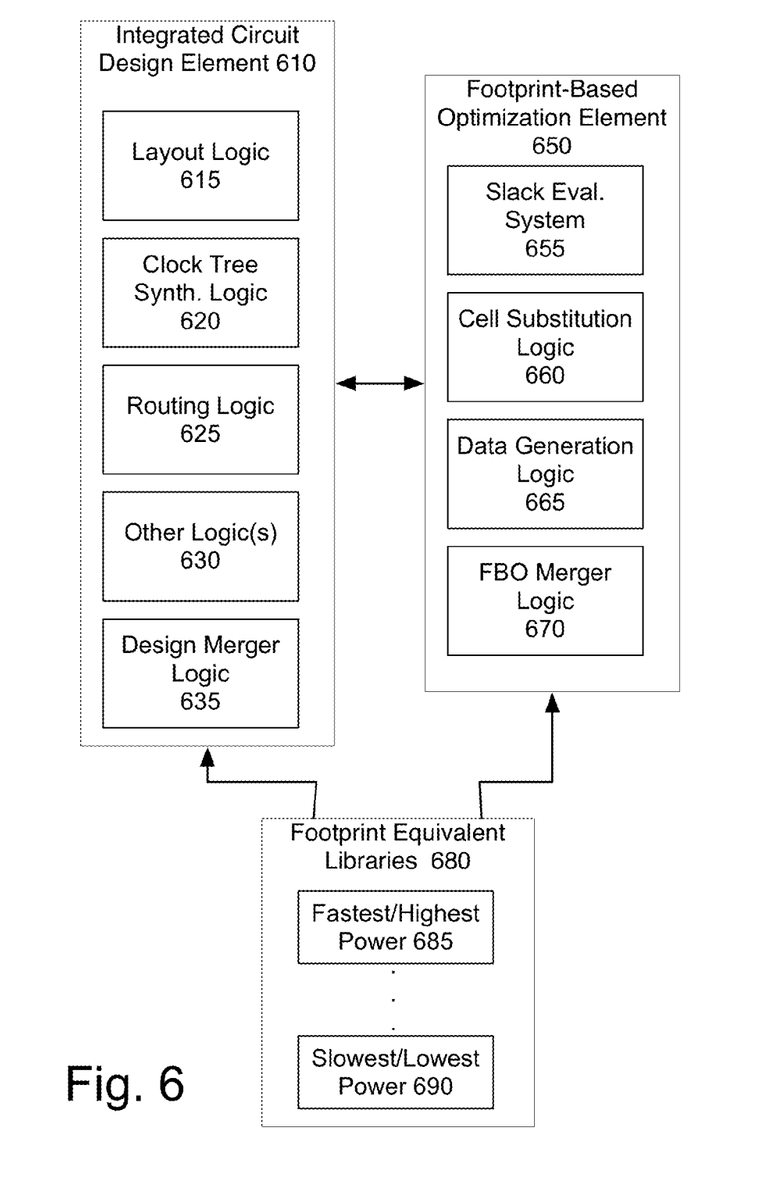
FIG. 6 is a block diagram of one embodiment of a system that may provide the optimization in accordance with the present invention.

FIG. 6 is a block diagram of one embodiment of a system that may provide the optimization in accordance with the present invention. The system, in one embodiment, may be implemented across a plurality of computer systems.

The integrated circuit design element 610 performs circuit design. In one embodiment, circuit design may include layout logic 615, clock tree synthesis 620, and routing logic 625. In one embodiment, additional logic 630, such as filler cell insertion, wire spreading, and other design steps may be included in integrated circuit design element 610.

Footprint based optimization element 650, includes a slack evaluation system 655, and cell substitution logic 660. In one embodiment, the footprint-based optimization element 650 may be active as the integrated circuit design element 610 lays out, routes, and otherwise designs the circuit. The footprint-based optimization element 650 receives the current circuit layout data from integrated circuit design element 610. Based on that information, the slack is evaluated by block 655, and cell substitution logic 660 selects the appropriate cell replacements from library 680. Library 680 includes a plurality of libraries, ranging from the fastest/highest power 685 to the slowest/lowest power 690. There may be one or more levels between these two.

Once footprint based optimization is complete, the data generation logic 665 generates the data that enables the merger of the substitutions calculated by footprint based optimization element into the integrated circuit layout generated by integrated circuit design element 610. Footprint-Based Optimization (FBO) Merger logic 670 passes the data to Design merger logic 635, which merges it into the final layout generated by the integrated circuit design element 610.

In this way, the system can, in parallel, perform the timing optimization and the leakage optimization, utilizing footprint-equivalent libraries.

Figure 7:
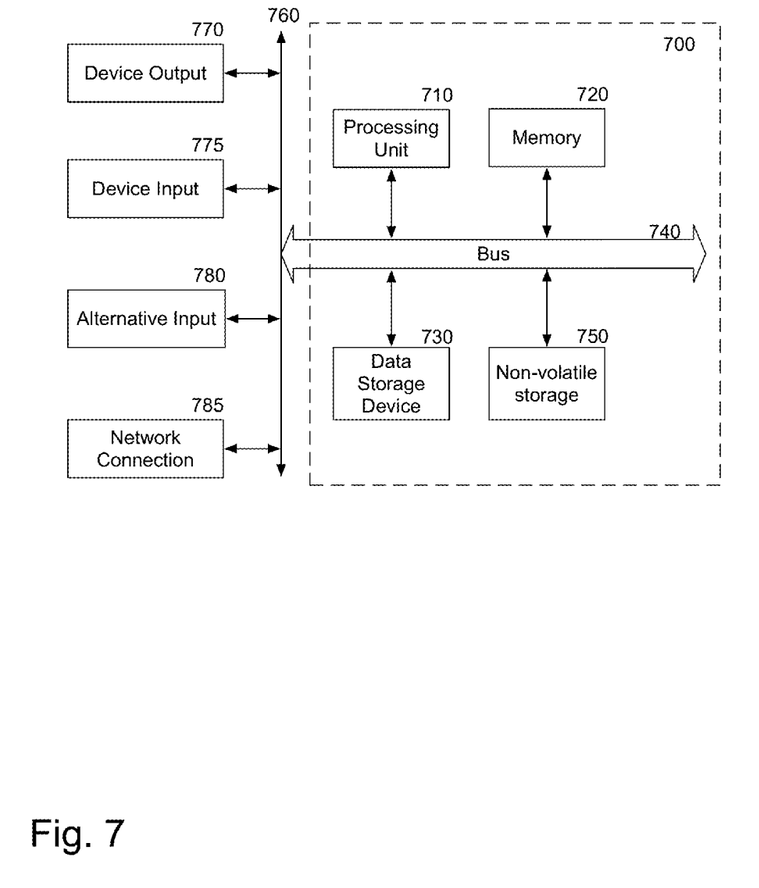
FIG. 7 is a block diagram of a computer system that may be used with the present invention.

FIG. 7 is a block diagram of a particular machine that may be used with the present invention. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment the system also includes a data storage device 730 such as a magnetic disk or optical disk and its corresponding disk drive, or Flash memory or other storage which is capable of storing data when no power is supplied to the system. Data storage device 730 in one embodiment is coupled to bus 740 for storing information and instructions.

The system may further be coupled to an output device 770, such as a cathode ray tube (CRT) or a liquid crystal display (LCD) coupled to bus 740 through bus 760 for outputting information. The output device 770 may be a visual output device, an audio output device, and/or tactile output device (e.g. vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 710, a data storage device 730, a bus 740, and memory 720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
  by using at least one computer, placing cells in a layout;
  performing clock tree synthesis to generate clock signals for an integrated circuit including the cells;
  performing routing to route signals for the integrated circuit; and
  in parallel with the routing, performing a footprint based optimization, substituting a cell with a footprint equivalent cell in a path based on a timing slack of the path, wherein the performing of the footprint based optimization comprises (i) evaluating the timing slack of the path and (ii) selecting the footprint equivalent cell based on a type and size of the timing slack.

2. The method of claim 1, wherein the footprint based optimization comprises selecting a slower, footprint equivalent cell when the path has positive timing slack.

3. The method of claim 1, wherein the footprint based optimization comprises selecting a faster, footprint equivalent cell when the path has negative slack.

4. The method of claim 1, further comprising:
  performing footprint based optimizations in parallel with a plurality of layout and optimizations steps.

5. The method of claim 1, further comprising:
  merging a result of the footprint based optimization into a main process.

6. The method of claim 5, wherein the merging uses one of a tool command language (TCL) or an engineering change order (ECO).

7. The method of claim 1, further comprising:
  identifying libraries of footprint equivalent cells; and
  selecting the footprint equivalent circuit element from an appropriate library.

8. A system comprising:
  at least one processor;
  an integrated circuit design element comprising:
    a layout logic to place cells;
    a clock tree synthesis logic to generate clock signals for an integrated circuit including the cells; and
    a routing logic to route signals for the integrated circuit; and
  a footprint-based optimization element comprising:
    a slack evaluation system to evaluate slack in a path; and
    a cell substitution logic to select a footprint equivalent cell substituting a cell in the path with the selected footprint equivalent cell based on a type and size of the slack,
  wherein the footprint-based optimization element operates in parallel with the routing logic of the integrated circuit design element.

9. The system of claim 8, wherein the cell substitution logic selects a slower, footprint equivalent element when the path has positive timing slack.

10. The system of claim 8, wherein the cell substitution logic selects a faster, footprint equivalent element when the path has negative slack.

11. The system of claim 8, further comprising:
  a merger logic to merge a result of the footprint based optimization into the integrated circuit generated by the integrated circuit design element.

12. The system of claim 11, wherein the merger logic uses one of a tool command language (TCL) or an engineering change order (ECO).

13. The system of claim 8, further comprising:
  a plurality of libraries of footprint equivalent cells, the libraries including a plurality levels of speed/power consumption,
  the cell substitution logic selecting an appropriate footprint equivalent cell from one of the plurality of libraries.

14. The system of claim 13, wherein the appropriate footprint equivalent cell is one of: one level faster than a current cell, one level slower than a current cell, a plurality of levels faster than a current cell, a plurality of levels slower than a current cell.

15. The system of claim 8, wherein the integrated circuit design element is executed on a processor, and the footprint based optimization element is executed on a different processor based on an intermediate result of the integrated circuit design element.

16. A computer program product stored as program code on a non-transitory computer-readable medium, the program code executable by at least one processor to reduce processing time in circuit design, the computer program product comprising a computer readable program code comprising instructions for:
  placing cells in a layout;
  performing clock tree synthesis to generate clock signals for an integrated circuit including the cells;
  performing routing to route signals for the integrated circuit; and
  performing, in parallel with the routing, a footprint based optimization by substituting a cell with a footprint equivalent cell in a path based on a timing slack of the path, wherein the performing of the footprint based optimization comprises (i) evaluating the timing slack of the path and (ii) selecting the footprint equivalent cell based on a type and size of the timing slack.

17. The computer program product of claim 16, wherein:
  the footprint based optimization comprises selecting a slower, footprint equivalent cell when the path has positive timing slack; and
  the footprint based optimization comprises selecting a faster, footprint equivalent cell when the path has negative slack.

18. The computer program product of claim 16, the computer readable program code further comprising instructions for:
  identifying libraries of footprint equivalent cells; and
  selecting the footprint equivalent cell from an appropriate library.

* * * * *